United States Patent
Kagiwada

(10) Patent No.: US 11,289,874 B2
(45) Date of Patent: Mar. 29, 2022

(54) CONTROL DEVICE AND CONTROL METHOD FOR CONTROLLING LASER OSCILLATOR

(71) Applicant: Fanuc Corporation, Yamanashi (JP)

(72) Inventor: Satoshi Kagiwada, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 70 days.

(21) Appl. No.: 16/929,340

(22) Filed: Jul. 15, 2020

(65) Prior Publication Data

US 2021/0028594 A1    Jan. 28, 2021

(30) Foreign Application Priority Data

Jul. 26, 2019  (JP) .............................. JP2019-137863

(51) Int. Cl.
  *H01S 3/10*  (2006.01)
  *H01S 3/13*  (2006.01)
  *H01S 3/097*  (2006.01)
  *H01S 3/134*  (2006.01)
  *H01S 3/04*  (2006.01)

(52) U.S. Cl.
  CPC .................. *H01S 3/10* (2013.01); *H01S 3/04* (2013.01); *H01S 3/09702* (2013.01); *H01S 3/10015* (2013.01); *H01S 3/13* (2013.01); *H01S 3/134* (2013.01)

(58) Field of Classification Search
  CPC .......... H01S 3/10015; H01S 3/13; H01S 3/10; H01S 3/09702; H01S 3/134; H01S 3/04
  See application file for complete search history.

(56) References Cited

U.S. PATENT DOCUMENTS

| | | | | |
|---|---|---|---|---|
| 5,504,766 A | * | 4/1996 | Watanabe | H01S 3/10 372/38.09 |
| 2002/0006149 A1 | * | 1/2002 | Spangler | G03F 7/70025 372/61 |
| 2002/0154669 A1 | * | 10/2002 | Spangler | G03F 7/70041 372/55 |
| 2005/0008059 A1 | * | 1/2005 | Nunokawa | H01S 3/025 372/98 |
| 2008/0205460 A1 | * | 8/2008 | Okaniwa | H01S 3/10013 372/29.015 |
| 2017/0093116 A1 | * | 3/2017 | Zhang | H01S 3/136 |
| 2020/0381886 A1 | * | 12/2020 | Konishi | H01S 5/0264 |

FOREIGN PATENT DOCUMENTS

JP         2001053357 A      2/2001

* cited by examiner

*Primary Examiner* — Kinam Park
(74) *Attorney, Agent, or Firm* — RatnerPrestia

(57) ABSTRACT

A control device that can apply a laser oscillator control device to various types of systems. The control device includes an analog signal input unit configured to receive an output control signal for controlling a laser output of the laser oscillator or a mode control signal for controlling an operation mode of the laser oscillator as an analog signal; a digital signal input unit configured to receive the output control signal or the mode control signal as a digital signal; and a controller configured to transmit a laser command for controlling the laser output to the laser oscillator in response to the output control signal received by the analog signal input unit or the digital signal input unit, and transmit an operation command for operating the laser oscillator to the laser oscillator in the operation mode in response to the mode control signal received by the analog signal input unit or the digital signal input unit.

8 Claims, 7 Drawing Sheets

CONTROL DEVICE AND CONTROL METHOD FOR CONTROLLING LASER OSCILLATOR

CROSS-REFERENCE TO RELATED APPLICATIONS

This application is a new U.S. Patent Application that claims benefit of Japanese Patent Application No. 2019-137863, filed Jul. 26, 2019, the disclosure of which is incorporated herein by reference in its entirety for all purposes.

BACKGROUND OF THE INVENTION

1. Field of the Invention

The present invention relates to a control device and a control method for controlling a laser oscillator.

2. Description of the Related Art

A control device for controlling a laser oscillator is known (e.g., JP 2001-053357 A). Hitherto, there has been a demand for techniques capable of applying a laser oscillator control device to various systems.

SUMMARY OF THE INVENTION

In an aspect of the present disclosure, a control device configured to control a laser oscillator includes an analog signal input unit configured to receive, as an analog signal, an output control signal for controlling a laser output of the laser oscillator or a mode control signal for controlling an operation mode of the laser oscillator; a digital signal input unit configured to receive the output control signal or the mode control signal as a digital signal; and a controller configured to transmit a laser command for controlling the laser output to the laser oscillator, in response to the output control signal received by the analog signal input unit or the digital signal input unit, and transmit to the laser oscillator an operation command for operating the laser oscillator in the operation mode corresponding to the mode control signal received by the analog signal input unit or the digital signal input unit.

In another aspect of the present disclosure, a method of controlling a laser oscillator by the above-described control device includes inputting the output control signal or the mode control signal to one selected from the analog signal input unit and the digital signal input unit, and transmitting, by the controller, the laser command or the operation command to the laser oscillator to control operation of the laser oscillator.

According to the present disclosure, the laser oscillator control device is connected to various types of host controllers to be able to communicate with various types of signals (analog signal, digital signal) and can control the operation of the laser oscillator by the host controller. Accordingly, the control device can be applied to various types of laser systems, so that it can flexibly cope with various uses.

DETAILED DESCRIPTION

Figure 1:
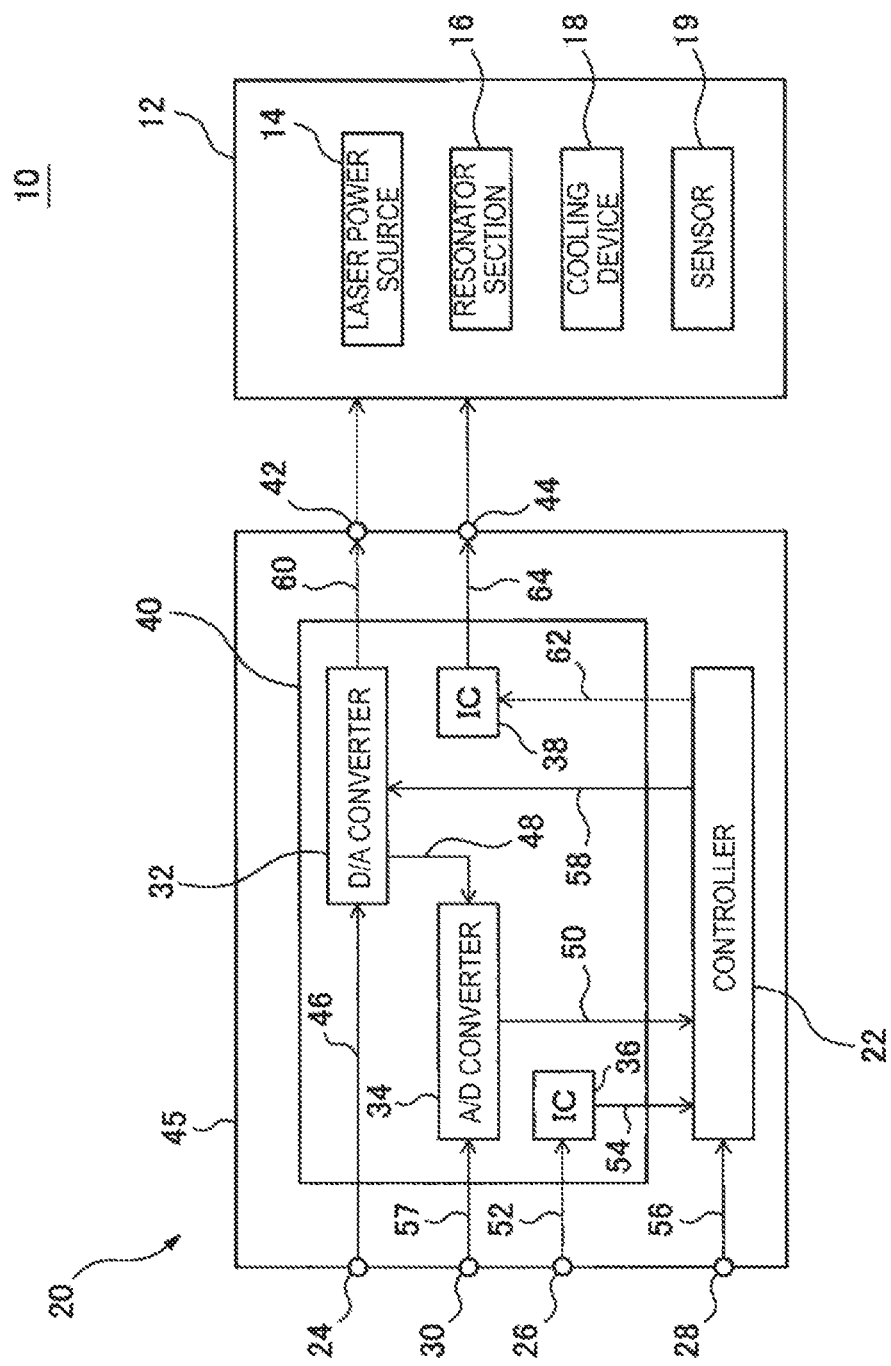
FIG. 1 is a block diagram of a laser device according to an embodiment.

Hereinafter, embodiments of the present disclosure will be described in detail with reference to the drawings. In the various embodiments described below, the similar components are denoted by the same reference numerals, and redundant description thereof will be omitted. With reference to FIG. 1, a laser device 10 according to an embodiment will be described. The laser device 10 includes a laser oscillator 12 and a control device 20 configured to control the laser oscillator 12.

The laser oscillator 12 generates and outputs a laser beam. Specifically, the laser oscillator 12 includes a laser power source 14, a resonator section 16, a cooling device 18, and a sensor 19. As an example, the laser oscillator 12 is a fiber laser oscillator, and the resonator section 16 includes a plurality of laser diode modules (not illustrated) configured to generate and output a laser beam. As another example, the laser oscillator 12 is a gas laser oscillator, and the resonator section 16 includes a discharge tube in which a laser medium (carbon dioxide gas, nitrogen gas, argon gas, etc.) is circulated, and a main electrode and an auxiliary electrode provided at the discharge tube (both not illustrated).

The laser power source 14 supplies power for laser generation to the resonator section 16. The cooling device 18 is installed in the resonator section 16 and cools the resonator section 16. For example, the cooling device 18 includes a refrigerant circulation path configured to circulate a refrigerant therein, and a fan (or a refrigerant circulation device, both not illustrated) configured to flow and circulate the refrigerant in the refrigerant circulation path.

The sensor 19 includes e.g. a temperature sensor configured to measure the temperature of each component of the laser oscillator 12 (the resonator section 16, the refrigerant of the cooling device 18, etc.), a flow meter configured to measure the flow rate of the refrigerant circulating in the refrigerant circulation path of the cooling device 18, and a laser output sensor configured to measure a laser output $O_L$ of the laser oscillator 12.

The control device 20 includes a controller 22, digital signal input units 24, 26, and 28, an analog signal input unit 30, a digital/analog converter (D/A converter) 32, an analog/digital converter (A/D converter) 34, IC chips 36 and 38, a substrate 40, a laser command output unit 42, an operation command output unit 44, and a housing 45.

The digital signal input unit 24 receives an output control signal $S_O$ for controlling the laser output $O_L$ of the laser oscillator 12 as a digital signal. The laser output $O_L$ indicates the laser power or laser intensity of the laser beam outputted by the laser oscillator 12, and the output control signal $S_O$ includes information of the laser output $O_L$.

The digital signal input unit 24 is configured to receive the output control signal $S_O$ as a first type of digital signal. The first type of digital signal is e.g. a digital signal of optical communication (FANUC Serial Servo Bus communication, i.e., FSSB communication, etc. Period: approximately microsecond order). However, the digital signal input unit 24 may receive any type of digital signal.

The digital signal input unit 24 is connected to the D/A converter 32 via a communication line 46, and the output control signal $S_O$ received by the digital signal input unit 24 is input to the D/A converter 32 through the communication line 46. The D/A converter 32 converts the output control signal $S_O$ received by the digital signal input unit 24 into an analog signal and outputs it.

The D/A converter 32 is connected to the A/D converter 34 via a communication line 48, and the output control signal Sc outputted by the D/A converter 32 is input to the A/D converter 34 through the communication line 48. The A/D converter 34 converts the output control signal $S_O$ from the D/A converter 32 into the first type of digital signal (e.g., optical communication digital signal) and outputs it. The A/D converter 34 is connected to the controller 22 via a communication line 50, and the output control signal $S_O$ outputted by the A/D converter 34 is supplied to the controller 22 through the communication line 50.

The digital signal input unit 26 is provided separate from the digital signal input unit 24, and receives a mode control signal $S_M$ for controlling the operation mode OM of the laser oscillator 12 as a digital signal. The digital signal input unit 26 is configured to receive the mode control signal $S_M$ as a second type of digital signal. The second type of digital signal is e.g. a digital input/output (DI/DO) signal. However, the digital signal input unit 26 may receive any type of digital signal.

The digital signal input unit 26 is connected to the IC chip 36 via a communication line 52, and the mode control signal $S_M$ received by the digital signal input unit 26 is input to the IC chip 36 through the communication line 52. The IC chip 36 converts the output control signal $S_O$ as the second type of digital signal, which is input from the digital signal input unit 26, into another type of digital signal and outputs it.

The other type of digital signal may be e.g. the above-described first type of digital signal (i.e., optical communication digital signal). The IC chip 36 is connected to the controller 22 via a communication line 54, and the mode control signal $S_M$ (e.g., the first type of digital signal) outputted by the IC chip 36 is input to the controller 22 through the communication line 54.

The digital signal input unit 28 is provided separate from the digital signal input units 24 and 26, and receives at least one of the output control signal $S_O$ and the mode control signal $S_M$ as a digital signal. The digital signal input unit 28 is configured to receive at least one of the output control signal $S_O$ and the mode control signal $S_M$ as a third type of digital signal.

The third type of digital signal is e.g. an Ethernet or EtherCAT standard digital signal (period: approximately millisecond order). However, the digital signal input unit 28 may receive any type of digital signal. The digital signal input unit 28 is connected to the controller 22 via a communication line 56, and at least one of the output control signal $S_O$ and the mode control signal $S_M$ received by the digital signal input unit 28 is input to the controller 22 through the communication line 56.

The analog signal input unit 30 receives the output control signal Sc or the mode control signal $S_M$ as an analog signal. The analog signal input unit 30 is connected to the A/D converter 34 via a communication line 57, and the output control signal $S_O$ or the mode control signal $S_M$ received by the analog signal input unit 30 is input to the A/D converter 34 through the communication line 57. The A/D converter 34 converts the output control signal $S_O$ or the mode control signal $S_M$ from the analog signal input unit 30 into a digital signal (e.g., the first type of digital signal) and outputs it to the controller 22 through the communication line 50.

The controller 22 is e.g. a computer (computer numerical control device: CNC, etc.) having a processor (CPU, GPU, etc.) and a memory (ROM, RAM, etc.), and controls the operation of each component of the laser oscillator 12 (i.e., the laser power source 14, the resonator section 16, the cooling device 18, and the sensor 19).

The controller 22 transmits a laser command $C_L$ for controlling the laser output $O_L$ of the laser oscillator 12 to the laser oscillator 12, in response to the output control signal $S_O$ received by the digital signal input unit 24 or 28, or the analog signal input unit 30. The laser command $C_L$ includes information of the laser output $O_L$ corresponding to the output control signal $S_O$. The controller 22 is connected to the D/A converter 32 via a communication line 58, generates the laser command $C_L$ as a digital signal (e.g., the first type of digital signal) in response to the output control signal $S_O$, and outputs it to the D/A converter 32.

The D/A converter 32 converts the laser command $C_L$ outputted by the controller 22 from the digital signal into an analog signal, and outputs it to the laser command output unit 42 through a communication line 60. The laser command output unit 42 outputs the laser command $C_L$ input from the D/A converter 32 to the laser power source 14 of the laser oscillator 12. The laser power source 14 supplies power in accordance with the laser command $C_L$ to the resonator section 16 of the laser oscillator 12, and the resonator section 16 generates and outputs a laser beam having the laser output $O_L$ in accordance with the laser command $C_L$.

On the other hand, the controller 22 transmits to the laser oscillator 12 an operation command $C_O$ for operating the laser oscillator 12 in the operation mode OM corresponding to the mode control signal $S_M$ received by the digital signal input unit 26 or 28, or the analog signal input unit 30. Hereinafter, an example of control of the operation mode OM will be described with reference to FIG. 2.

Figure 2:
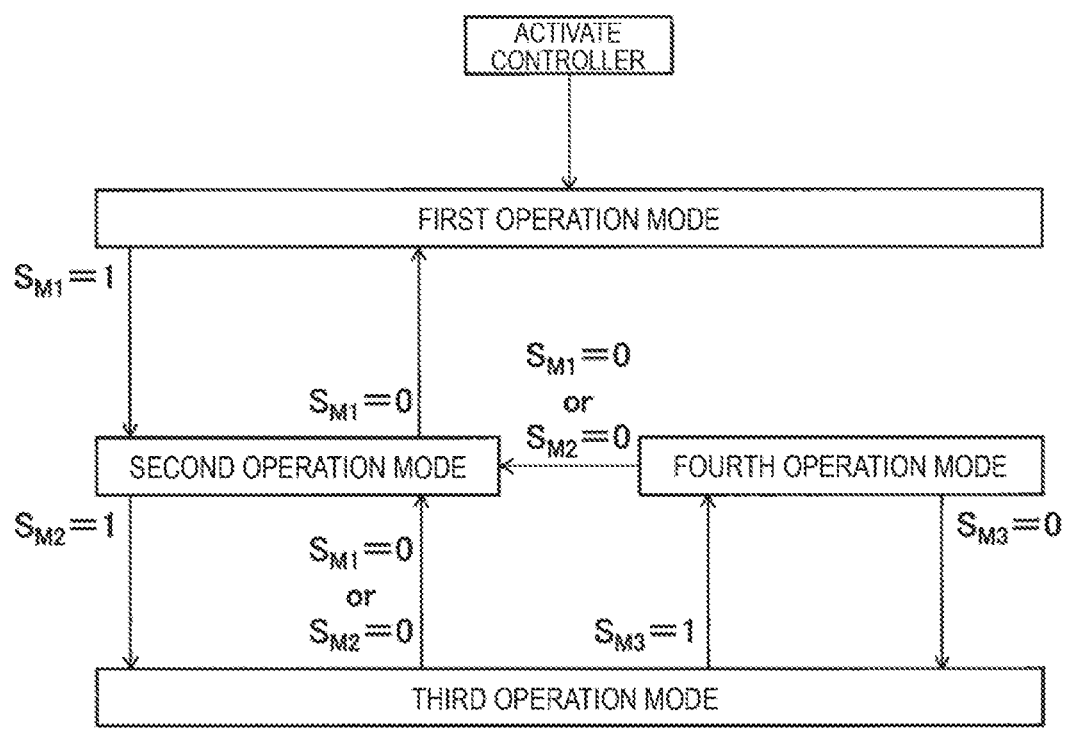
FIG. 2 is a diagram for describing control of an operation mode of a laser oscillator.

In the example illustrated in FIG. 2, the operation mode OM of the laser oscillator 12 includes a first operation mode $OM_1$, a second operation mode $OM_2$, a third operation mode $OM_3$, and a fourth operation mode $OM_4$. In the first operation mode $OM_1$, for example, the controller 22 sets a power source energization command $C_{O1}$ to be transmitted to the laser power source 14 to "0" (or off) in order to stop energization of the laser power source 14, while the controller 22 sets a cooling activation command $C_{O2}$ to be transmitted to the cooling device 18 to "0" (or off) in order to stop the operation of the cooling device 18 (specifically, fan or refrigerant circulation device).

In the second operation mode $OM_2$, for example, the controller 22 maintains the power source energization command $C_{O1}$ for the laser power source 14 at "0", and sets the cooling activation command $C_{O2}$ for the cooling device 18 to "1" (or on) in order to activate the cooling device 18 (fan or refrigerant circulation device). The controller 22 sets the sensor activation command $C_{O3}$ to be transmitted to the sensor 19 to "1" (or on) in order to cause the sensor 19 to obtain a measurement value (temperature, flow rate, laser output, etc.) and start to transmit various alarms (temperature abnormal alarm, flow rate abnormal alarm, laser power abnormal alarm, etc.) based on the measurement value.

In the third operation mode $OM_3$, for example, the controller 22 maintains the cooling activation command $C_{O2}$ for the cooling device 18 at "1", and sets the power source energization command $C_{O1}$ for the laser power source 14 to "1" (or on) in order to carry out the energization of the laser power source 14 and allow the laser power source 14 to supply the power to the resonator section 16.

As an example, if the laser oscillator 12 is a fiber laser oscillator and the controller 22 transmits the laser command $C_L$ to the laser power source 14 during the third operation mode $OM_3$, the laser power source 14 supplies the power in accordance with the laser command $C_L$ to the laser diode modules of the resonator section 16, and causes the laser diode modules to generate the laser beam having the laser output $O_L$.

As another example, if the laser oscillator 12 is a gas laser oscillator and the controller 22 transmits the laser command $C_L$ to the laser power source 14 during the third operation mode $OM_3$, the laser power source 14 supplies the power in accordance with the laser command $C_L$ to the main electrode of the resonator section 16 so as to generate a main discharge in the discharge tube of the resonator section 16, thereby generating the laser beam having the laser output $O_L$.

In the fourth operation mode $OM_4$, for example, the controller 22 maintains the power source energization command $C_{O1}$ for the laser power source 14 and the cooling activation command $C_{O2}$ for the cooling device 18 at "1", and sets an energy saving command $C_{O4}$ for reducing the power consumption of the laser power source 14 to "1" (or on). As an example, if the laser oscillator 12 is the fiber laser oscillator, in the fourth operation mode $OM_4$, the controller 22 maintains the laser power source 14 in an energized state, while stopping the power supply from the laser power source 14 to the laser diode modules of the resonator section 16.

As another example, if the laser oscillator 12 is the gas laser oscillator, in the fourth operation mode $OM_4$, the controller 22 maintains the laser power source 14 in an energized state, and stops the power supply from the laser power source 14 to the main electrode of the resonator 16 to turn off the main discharge, while supplying power from the laser power source 14 to the auxiliary electrode of the resonator section 16 so as to cause a base discharge in the discharge tube of the resonator section 16.

The fourth operation mode $OM_4$ is a so-called power-saving standby mode, in which the power consumption of the laser power source 14 (i.e., the resonator section 16) in the fourth operation mode $OM_4$ is smaller than the third operation mode $OM_3$ and is larger than the second operation mode $OM_2$. During the fourth operation mode $OM_4$, the laser power source 14 does not perform the operation to supply the power in accordance with the laser command $C_L$ to the resonator section 16. The above-described power source energization command $C_{o1}$, the cooling activation command $C_{O2}$, the sensor activation command $C_{O3}$, and the energy saving command $C_{O4}$ constitute the operation command $C_O$ for operating the laser oscillator 12 in the respective operation modes $OM_1$, $OM_2$, $OM_3$, and $OM_4$.

As illustrated in FIG. 2, when the controller 22 is activated (i.e., when the power of the controller 22 is turned on), the controller 22 shifts the operation mode OM of the laser oscillator 12 to the first operation mode $OM_1$. In the present embodiment, the mode control signal $S_M$ includes a first mode control signal $S_{M1}$, a second mode control signal $S_{M2}$, and a third mode control signal $S_{M3}$.

The first mode control signal $S_{M1}$ is a signal for shifting the operation mode OM from the first operation mode $OM_1$ to the second operation mode $OM_2$. The second mode control signal $S_{M2}$ is a signal for shifting the operation mode OM from the second operation mode $OM_2$ to the third operation mode $OM_3$. The third mode control signal $S_{M3}$ is a signal for shifting the operation mode OM from the third operation mode $OM_3$ to the fourth operation mode $OM_4$. These mode control signals $S_{M1}$, $S_{M2}$, and $S_{M3}$ are each a binary signal of "0" or "1" (i.e., on or off), for example.

The controller 22 is configured to receive only the first mode control signal $S_{M1}$ while operating the laser oscillator 12 in the first operation mode $OM_1$. When the first mode control signal $S_{M1}$ becomes "1" during the first operation mode $OM_1$, as illustrated in FIG. 2, the controller 22 shifts the operation mode OM of the laser oscillator 12 from the first operation mode $OM_1$ to the second operation mode $OM_2$.

The controller 22 is enabled to receive the second mode control signal $S_{M2}$ while operating the laser oscillator 12 in the second operation mode $OM_2$. When the second mode control signal $S_M$ becomes "1" during the second operation mode $OM_2$, the controller 22 shifts the operation mode OM of the laser oscillator 12 from the second operation mode $OM_2$ to the third operation mode $OM_2$. On the other hand, when the first mode control signal $S_{M1}$ becomes "0" during the second operation mode $OM_2$, the controller 22 shifts the operation mode OM of the laser oscillator 12 from the second operation mode $OM_2$ to the first operation mode $OM_1$.

The controller 22 is enabled to receive the third mode control signal $S_{M3}$ while operating the laser oscillator 12 in the third operation mode $OM_3$. When the third mode control signal $S_{M3}$ becomes "1" during the third operation mode $OM_3$, the controller 22 shifts the operation mode OM of the laser oscillator 12 from the third operation mode $OM_3$ to the fourth operation mode $OM_4$. On the other hand, when the first mode control signal $S_{M1}$ or the second mode control signal $S_{M2}$ becomes "0" during the third operation mode $OM_3$, the controller 22 shifts the operation mode OM of the laser oscillator 12 from the third operation mode $OM_3$ to the second operation mode $OM_2$.

When the third mode control signal $S_{M3}$ becomes "0" during the fourth operation mode $OM_4$, the controller 22 shifts the operation mode OM of the laser oscillator 12 from the fourth operation mode $OM_4$ to the third operation mode $OM_3$. On the other hand, when the first mode control signal $S_{M1}$ or the second mode control signal $S_2$ becomes "0" during the fourth operation mode $OM_4$, the controller 22 shifts the operation mode OM of the laser oscillator 12 from the fourth operation mode $OM_4$ to the second operation mode $OM_2$.

As described above, in response to the mode control signal $S_M$, the controller 22 controls the operation mode OM of the laser oscillator 12 so as to shift to the first operation mode $O_{M1}$, the second operation mode $OM_2$, the third operation mode $OM_3$, or the fourth operation mode $OM_4$, and outputs the operation command $C_O$ (the power source energization command $C_{O1}$, the cooling activation command $C_{O2}$, the sensor activation command $C_{O3}$, the energy saving command $C_{O4}$) for operating the laser oscillator 12 in the first operation mode $OM_1$, the second operation mode $OM_2$, the third operation mode $OM_3$, or the fourth operation mode $OM_4$.

Referring again to FIG. 1, the controller 22 is connected to the IC chip 38 via a communication line 62, and outputs the operation command $C_O$ (the power source energization command $C_{O1}$, the cooling activation command $C_{O2}$, the sensor activation command $C_{O3}$, the energy saving command $C_{O4}$) to the IC chip 38. The IC chip 38 converts the operation command $C_O$ from the controller 22 into a signal (e.g., analog signal) that can be input to the component of the laser oscillator 12 (i.e., the laser power source 14, the cooling device 18, or the sensor 19), and outputs it to the operation command output unit 44 through a communication line 64.

The operation command output unit 44 transmits the operation command $C_O$ outputted by the IC chip 38 to the component of the laser oscillator 12, and causes the component to execute the operation corresponding to the operation mode OM. For example, in the case of the third operation mode $OM_3$, the operation command output unit 44 transmits the power source energization command $C_{O1}$ to the laser power source 14 so as to energize the laser power source, and transmits the cooling activation command $C_{O2}$ to the cooling device 18 (fan or refrigerant circulation device) so as to operate the cooling device 18.

Note that, if the laser command $C_L$ and the operation command $C_O$ are preliminarily prescribed in the computer program stored in the memory of the controller 22, the controller 22 may control the laser oscillator 12 as described above in accordance with the computer program, without receiving the output control signal $S_O$ and the mode control signal $S_M$ from an external device (e.g., a host controller set forth later).

In the present embodiment, the D/A converter 32, the A/D converter 34, and the IC chips 36 and 38 are mounted on the substrate 40. The housing 45 is a hollow box-shaped member, and the substrate 40 and the controller 22 are housed inside the housing 45. For example, the digital signal input units 24, 26 and 28, the analog signal input unit 30, the laser command output unit 42, and the operation command output unit 44 are provided at the housing 45 so as to face the outside of the housing 45.

Figure 3:
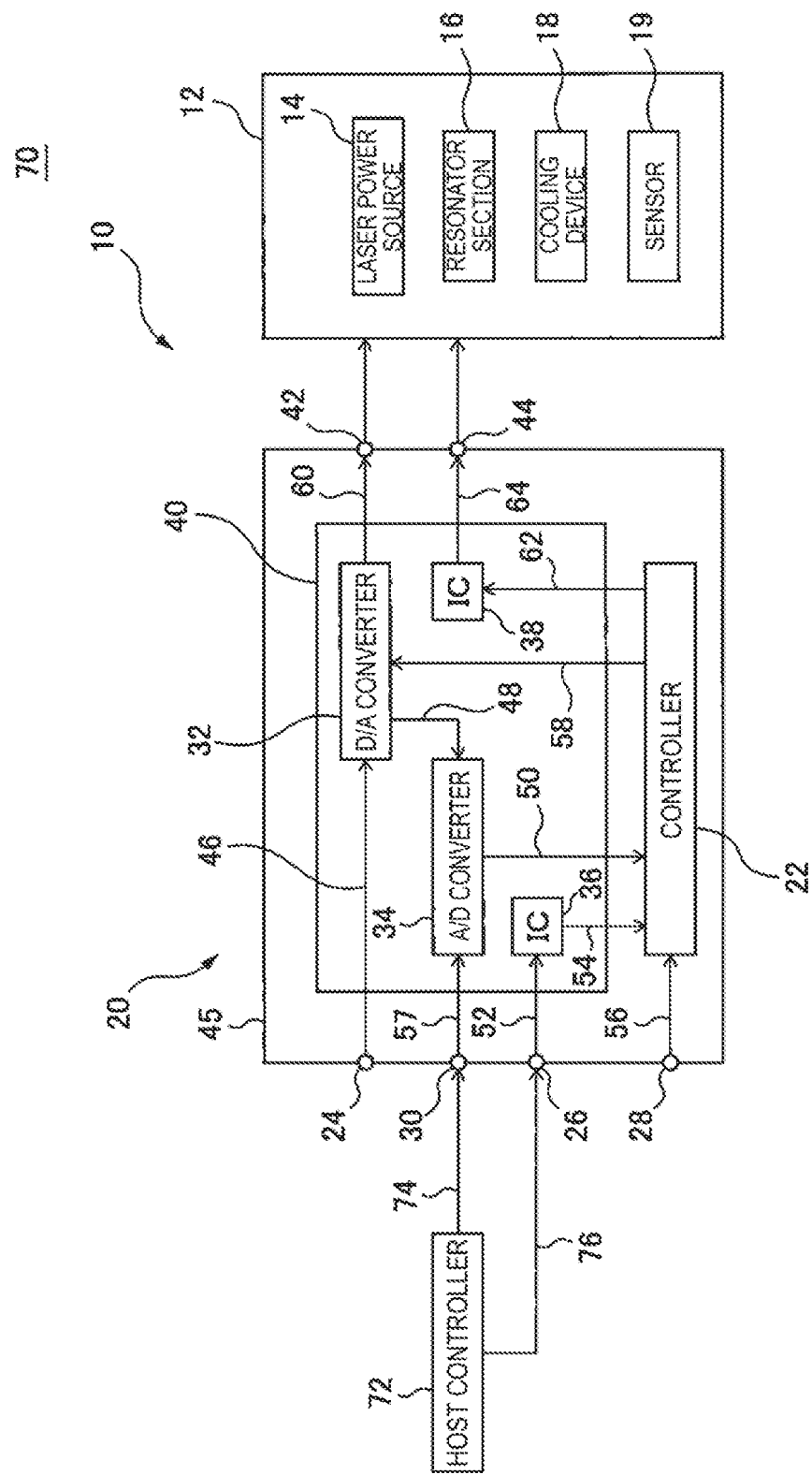
FIG. 3 is a block diagram of a laser system according to the embodiment.

Next, a laser system 70 according to an embodiment is described with reference to FIG. 3. The laser system 70 includes a host controller 72 and the laser device 10. The host controller 72 is a computer having a processor (CPU, GPU, etc.), a memory (ROM, RAM, etc.), an operating section (keyboard, mouse, touch sensor, etc.), and a display device (liquid crystal display, organic EL display, etc.).

The host controller 72 is e.g. a programmable logic controller (PLC). The host controller 72 is connected to the analog signal input unit 30 of the control device 20 via an analog communication cable 74, and connected to the digital signal input unit 28 of the control device 20 via a digital communication cable 76. The digital communication cable 76 is capable of transmitting the second type of digital signal (e.g., DI/DO signal).

The host controller 72 inputs the output control signal $S_O$ as an analog signal to the analog signal input unit 30 through the analog communication cable 74. In response to the output control signal $S_O$ from the host controller 72, the controller 22 transmits the laser command $C_L$ to the laser power source 14 of the laser oscillator 12, and causes the resonator section 16 to output the laser beam having the laser output $O_L$ in accordance with the laser command $C_L$.

Further, the host controller 72 inputs the mode control signal $S_M$ as the second type of digital signal through the digital communication cable 76 to the digital signal input unit 26. In response to the mode control signal $S_M$ from the host controller 72, the controller 22 controls the operation mode OM of the laser oscillator 12 to the first operation mode $OM_1$, the second operation mode $OM_2$, the third operation mode $OM_3$, or the fourth operation mode $OM_4$.

Figure 4:
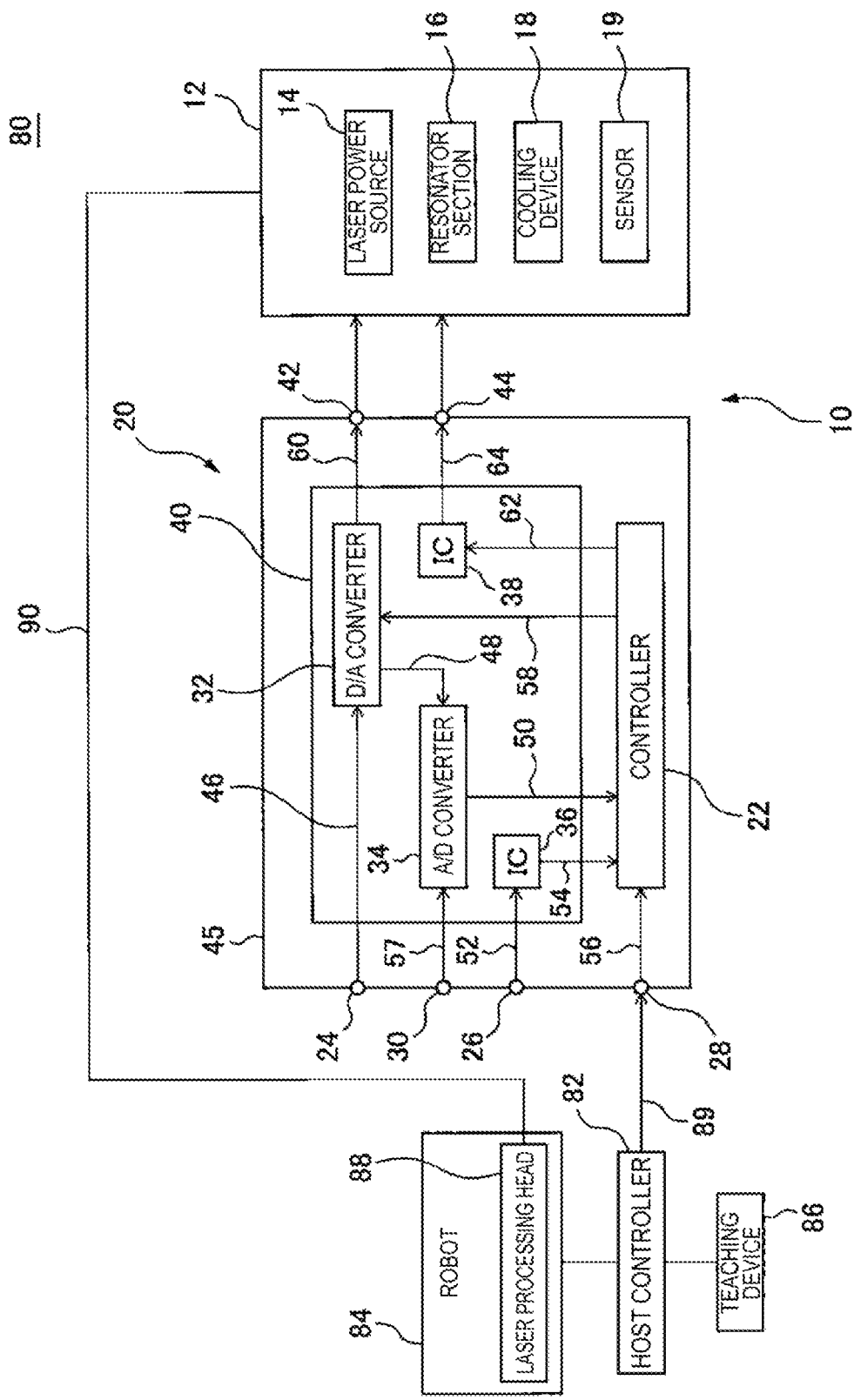
FIG. 4 is a block diagram of a laser system according to another embodiment.

Next, a laser system 80 according to still another embodiment will be described with reference to FIG. 4. The laser system 80 includes a host controller 82, a robot 84, a teaching device 86, and the laser device 10. The host controller 82 is a computer having a processor (CPU, GPU, etc.), a memory (ROM, RAM, etc.), an operating section (keyboard, mouse, touch sensor, etc.), and a display device (liquid crystal display, organic EL display, etc.).

In the present embodiment, the host controller 82 is a robot controller configured to control the operation of the robot 84. The robot 84 is a vertical (or horizontal) articulated type robot, a parallel link robot, or the like, and includes a robot arm (not illustrated) and a laser processing head 88 attached to the robot arm.

The robot 84 positions the laser processing head 88 at any position and orientation by operating the robot arm. The laser processing head 88 is optically connected to the resonator section 16 of the laser oscillator 12 via a light guide path 90. The laser processing head 88 includes a nozzle having an exit port, and an optical system such as a focus lens disposed inside the nozzle (both not illustrated).

As an example, the light guide path 90 is comprised of an optical fiber which extends from the resonator section 16 to as to be laid along a component of the robot 84 (the robot arm, etc.), and is connected to the laser processing head 88. As another example, the light guide path 90 may be comprised of a hollow path and a reflecting mirror. The laser beam outputted from the resonator section 16 of the laser oscillator 12 propagates through the light guide path 90, enters the laser processing head 88, and is emitted from the exit port provided at the nozzle of the laser processing head 88.

The host controller 82 operates the robot 84 to position the laser processing head 88 at a desired position and orientation, and irradiates a laser beam emitted from the laser processing head 88 onto a workpiece (not illustrated). In this way, the laser system 80 executes laser processing (laser cutting, laser welding, etc.) on the workpiece.

The teaching device 86 is for teaching the robot 84, and includes e.g. a display device (liquid crystal display, organic EL display, etc.), and an operating section (keyboard, mouse, touch sensor, etc.). By operating the operating section of the teaching device 86, the operator can carry out jogging movement of the robot 84 via the host controller 82, and teach the robot 84 a motion for the laser processing.

The host controller 82 is connected to the digital signal input unit 28 of the control device 20 via a digital communication cable 89. The digital communication cable 89 is capable of transmitting the third type of digital signal (e.g., Ethernet or EtherCAT digital signal).

If the third type of digital signal is the Ethernet or EtherCAT standard digital signal, the digital communication cable 89 is capable of communicating at a communication speed, the period of which is approximately millisecond order. The host controller 82 outputs the output control signal $S_O$ and the mode control signal $S_M$ as the third type of digital signal to the digital signal input unit 28 through the digital communication cable 89.

In response to the output control signal $S_O$ from the host controller 82, the controller 22 transmits the laser command $C_L$ to the laser power source 14 to cause the resonator section 16 to output the laser beam of the laser output $O_L$. Further, in response to the mode control signal $S_M$ from the host controller 72, the controller 22 controls the operation mode OM of the laser oscillator 12 to the first operation mode $OM_1$, the second operation mode $OM_2$, the third operation mode $OM_3$, or the fourth operation mode $OM_4$.

In this way, the host controller 82 indirectly controls the laser oscillator 12 via the controller 22, along with controlling the robot 84, whereby executing the laser processing. The data of the measurement value (temperature, flow rate, laser output, etc.) obtained by the sensor 19 of the laser oscillator 12 during the laser processing is fed back to the host controller 82. The host controller 82 displays the measurement value obtained from the sensor 19 on the display device of the host controller 82 or the teaching device 86.

Further, the host controller 82 obtains various alarms (the temperature abnormal alarm, the flow rate abnormal alarm, the laser power abnormal alarm, etc.) transmitted by the controller 22 during the laser processing, and displays the alarms on the display device of the host controller 82 or the teaching device 86. From the measurement value and the alarms displayed in this manner, the operator can understand the state of the laser oscillator 12 during the laser processing.

Figure 5:
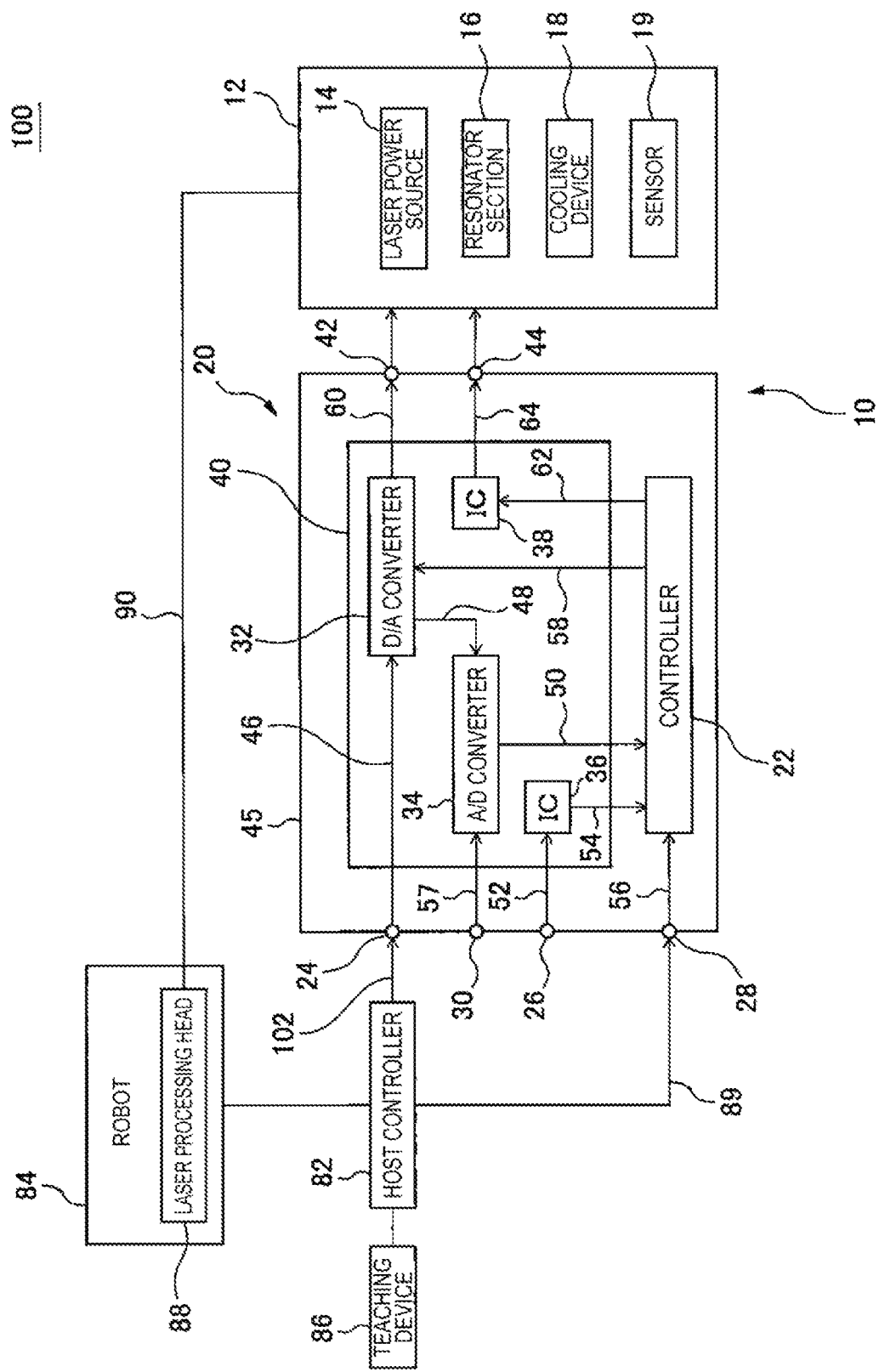
FIG. 5 is a block diagram of a laser system according to still another embodiment.

Next, a laser system 100 according to still another embodiment will be described with reference to FIG. 5. The laser system 100 is different from the above-described laser system 80 in the following configuration. Specifically, in the laser system 100, the host controller 82 is connected to the digital signal input unit 28 of the control device 20 via the digital communication cable 89, while it is connected to the digital signal input unit 24 of the control device 20 via a digital communication cable 102.

The digital communication cable 102 is a communication cable (e.g., optical communication cable) capable of transmitting the first type of digital signal (e.g., the optical communication digital signal). If the first type of digital signal is the optical communication (e.g., FSSB) digital signal, the digital communication cable 102 is capable of high-speed optical communication, the period of which is approximately microsecond order.

The host controller 82 inputs the output control signal $S_O$ as the first type of digital signal to the digital signal input unit 24 through the digital communication cable 102, while inputting the mode control signal $S_M$ as the third type of digital signal to the digital signal input unit 28 through the digital communication cable 89.

According to the present embodiment, if the output control signal $S_O$ is a high frequency signal, the host controller 82 can input the output control signal $S_O$ to the digital signal input unit 24 as the first type of digital signal (i.e., the optical communication (FSSB) digital signal) through the digital communication cable 102 capable of high-speed optical communication. Therefore, it is possible to control the laser output $O_L$ of the laser oscillator 12 at high speed.

As described above, the control device 20 is connected to the various types of host controllers 72 and 82 (i.e., PLC, robot controller, etc.) so as to be able to communicate therewith through the various types of signals (e.g., the analog signal, the first to third types of digital signal), such that the operation of the laser oscillator 12 can be controlled by the host controllers 72 and 82. Accordingly, since the control device 20 can be applied to the various types of laser system 70, 80, and 100, it is possible to flexibly adapt to various applications.

Further, according to the control device 20, signal processing between the signal input units 24, 26, 28 and 30 and the controller 22, and between the controller 22 and the command output units 42 and 44 can be executed by the D/A converter 32, the A/D converter 34 and the IC chips 36 and 38, which are mounted on the one substrate 40.

According to this configuration, by unitizing the substrate 40, the D/A converter 32, the A/D converter 34, and the IC chips 36 and 38, the unit can be commonly used in the plurality of control devices 20, and also it is possible to facilitate mass production of the unit. As a result, the manufacturing cost of the control device 20 can be reduced.

According to a method of controlling the laser oscillator 12 by such a control device 20, the operator selects one of the digital signal input units 24 and 28 and the analog signal input unit 30, to which the output control signal $S_O$ is to be input, in response to the host controller 72 or 82 to be used, and connects the selected one to the host controller 72 or 82 via the communication cable 102, 89 or 74. Further, the operator selects one of the digital signal input units 26 and 28 and the analog signal input unit 30, to which the mode control signal $S_M$ is to be input, and connects the selected one to the host controller 72 or 82 via the communication cable 76, 89 or 74.

Then, the host controller 72 or 82 inputs the output control signal $S_O$ to the selected digital signal input unit 24 or 28, or the analog signal input unit 30, and inputs the mode control signal $S_M$ to the selected digital signal input unit 26 or 28 or the analog signal input unit 30. Then, in response to the output control signal $S_O$ and the mode control signal $S_M$ which have been input thereto, the controller 22 transmits the laser command $C_L$ and the operation command $C_O$ to the laser oscillator 12, and controls the laser beam generation operation and the operation mode OM of the laser oscillator 12.

Figure 6:
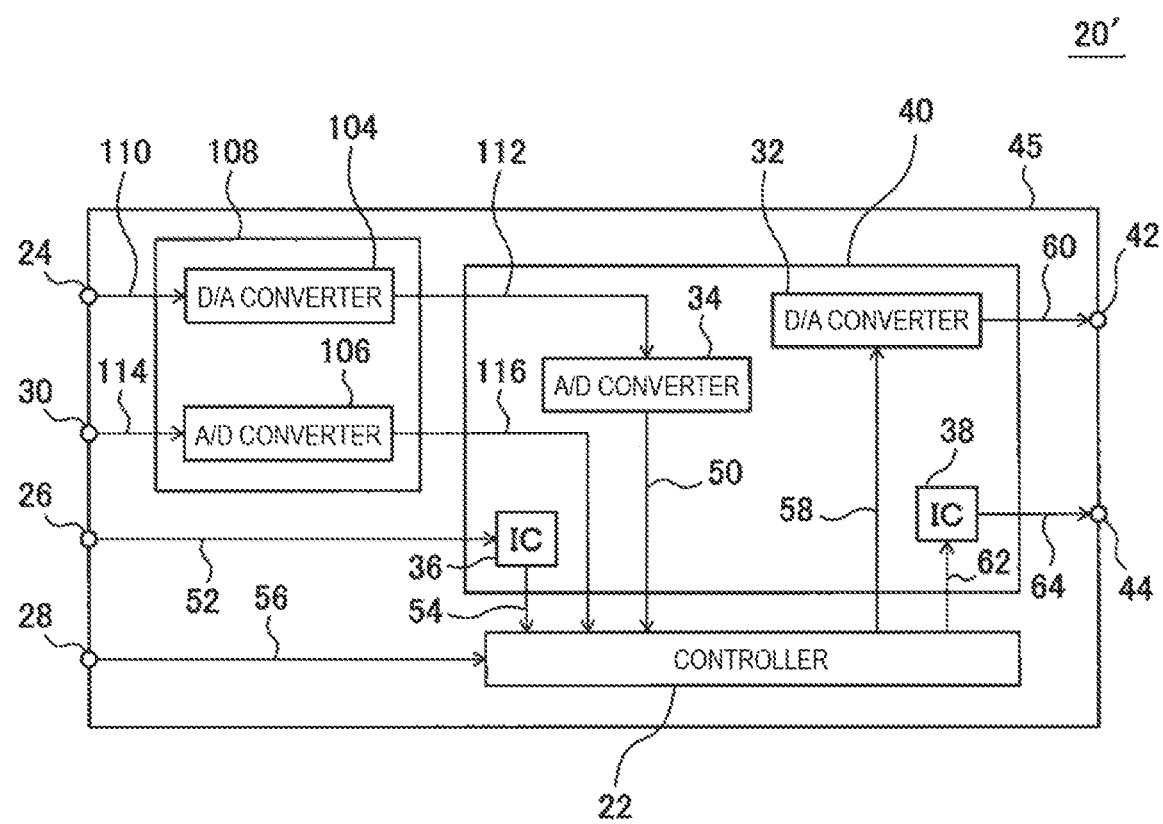
FIG. 6 is a block diagram of a control device according to another embodiment.

Next, a control device 20' according to another embodiment is described with reference to FIG. 6. The control device 20' is different from the above-described control device 20 in that the control device 20' further includes a D/A converter 104, an A/D converter 106, and a substrate 108. The input side of the D/A converter 104 is connected to the digital signal input unit 24 via a communication line 110, while the output side of the D/A converter 104 is connected to the A/D converter 34 via a communication line 112.

Further, the input side of the A/D converter 106 is connected to the analog signal input unit 30 via a communication line 114, while the output side of the A/D converter 106 is connected to the controller 22 via a communication line 116. The D/A converter 104 and the A/D converter 106 are mounted on the substrate 108. The substrate 108 is provided separately from the substrate 40, and is housed inside the housing 45.

The output control signal $S_O$ as the first type of digital signal (e.g., the optical communication digital signal) received by the digital signal input unit 24 is input to the D/A converter 104 via the communication line 110. The D/A converter 104 converts the output control signal $S_O$ received by the digital signal input unit 24 into an analog signal, and outputs it to the A/D converter 34 through the communication line 112.

On the other hand, the output control signal $S_O$ (or the mode control signal $S_M$) as an analog signal received by the analog signal input unit 30 is input to the A/D converter 106 through the communication line 114. The A/D converter 106 converts the output control signal $S_O$ (or mode control signal $S_M$) received by the analog signal input unit 30 into a digital signal, and outputs it to the controller 22 through the communication line 116. According to the present embodiment, it is possible to construct the control device 20' which has the same function as the control device 20, using the D/A converters 32 and 104 and A/D converters 34 and 106, each of which has only one pair of input/output terminals.

Figure 7:
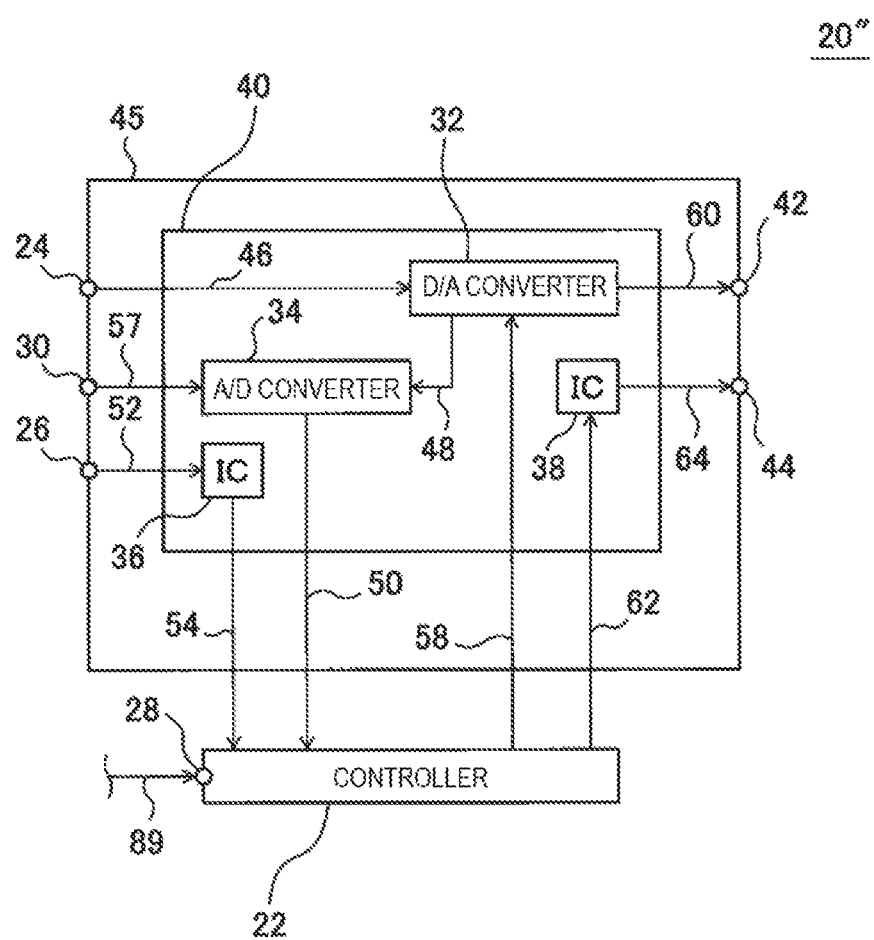
FIG. 7 is a block diagram of a control device according to still another embodiment.

Next, a control device 20" according to yet another embodiment is described with reference to FIG. 7. The control device 20" is different from the above-described control device 20 in that the controller 22 is installed outside the housing 45. In the present embodiment, the controller 22 is provided with the digital signal input unit 28 to which the above-described digital communication cable 89 can be connected. According to the present embodiment, since the controller 22 is installed outside the housing 45, setting change or maintenance of the controller 22 becomes easy, for example.

Note that, in the above-described laser system 80 (or 100), the host controller 82 and the control device 20 may be communicably connected via a communication network such as a LAN, Internet, etc. In this case, one end of the digital communication cable 89 (and 102) is connected to a router (not illustrated), while the other end of the digital communication cable 89 (and 102) is connected to the digital signal input unit 28 (and 24), wherein the host controller 82 can be communicably connected to the router via the communication network.

Further, the host controller 82 may be installed in a first site (management building, etc.), while the robot 84, the laser processing head 88, and the laser device 10 may be installed in a second site (factory, etc.), wherein the host controller 82 and the robot 84 may be communicably connected via the communication network. In this case, the host controller 82 can remotely control the robot 84 and the laser device 10.

In the above-described laser system 100, the digital communication cable 89 may be omitted, and the host controller 82 may be configured to input the output control signal $S_O$ and the mode control signal $S_M$ as the first type of digital signal to the digital signal input unit 24 through the digital communication cable 102.

Further, in the control device 20 or 20″, the digital signal input unit 24 may be directly connected to the controller 22 via another communication line, and the output control signal $S_O$ received by the digital signal input unit 24 may be directly input to the controller 22 through the other communication line without passing through the D/A converter 32 and the A/D converter 34.

Similarly, in the control device 20′, the output control signal $S_O$ received by the digital signal input unit 24 may be directly input to the controller 22 without passing through the D/A converter 104 and the A/D converter 34. In the control device 20′, the A/D converter 34 may be mounted on the substrate 108, while the A/D converter 106 may be mounted on the substrate 40.

In the above-described laser device 10, the laser oscillator 12 is installed outside the housing 45. However, the laser oscillator 12 may be housed inside the housing 45. In this case, the laser command output unit 42 and the operation command output unit 44 may be omitted, and the communication lines 60 and 64 may be directly connected to the laser oscillator 12 (the laser power source 14, the cooling device 18, the sensor 19, etc.).

The signal input unit 24, 26, 28, or 30 may be configured to wirelessly communicate with the host controller 72 or 82. The command output unit 42 or 44 may be configured to wirelessly communicate with the laser oscillator 12. Further, the above-described communication line 46, 48, 50, 52, 54, 56, 57, 58, 60, 62, 64, 110, 112, 114, or 116 may be wired or wireless. Although the present disclosure has been described through the above embodiments, the above embodiments are not intended to limit the claimed invention.

The invention claimed is:

1. A control device configured to control a laser oscillator, the control device comprising:
an analog signal input unit configured to receive, as an analog signal, an output control signal for controlling a laser output of the laser oscillator or a mode control signal for controlling an operation mode of the laser oscillator;
a digital signal input unit configured to receive, as a digital signal, the output control signal or the mode control signal; and
a controller configured to:
transmit a laser command for controlling the laser output to the laser oscillator, in response to the output control signal received by the analog signal input unit or the digital signal input unit; and
transmit to the laser oscillator an operation command for operating the laser oscillator in the operation mode corresponding to the mode control signal received by the analog signal input unit or the digital signal input unit.

2. The control device of claim 1, further comprising an A/D converter configured to convert the analog signal received by the analog signal input unit into a digital signal and supply it to the controller.

3. The control device of claim 1, wherein the controller outputs the laser command as a digital signal,
wherein the control device further comprises a D/A converter configured to convert the digital signal outputted by the controller into an analog signal and supply it to the laser oscillator.

4. The control device of claim 1, wherein the controller outputs the laser command as a digital signal,
wherein the control device further comprising:
an A/D converter configured to convert the analog signal received by the analog signal input unit into a digital signal and supply it to the controller;
a D/A converter configured to convert the digital signal outputted by the controller into an analog signal and supply it to the laser oscillator; and
one substrate on which the A/D converter and the D/A converter are mounted.

5. The control device of claim 1 further comprising:
a D/A converter configured to convert the digital signal received by the digital signal input unit into an analog signal; and
an A/D converter configured to convert the analog signal outputted by the D/A converter into a digital signal and supply it to the controller.

6. The control device of claim 5 further comprising one substrate on which the D/A converter and the A/D converter are mounted.

7. The control device of claim 5 further comprising:
a first substrate on which the D/A converter is mounted; and
a second substrate on which the A/D converter is mounted.

8. A method of controlling a laser oscillator by the control device of claim 1, comprising:
inputting the output control signal or the mode control signal to one selected from the analog signal input unit and the digital signal input unit; and
transmitting, by the controller, the laser command or the operation command to the laser oscillator to control operation of the laser oscillator.

* * * * *